UNITED STATES PATENT OFFICE.

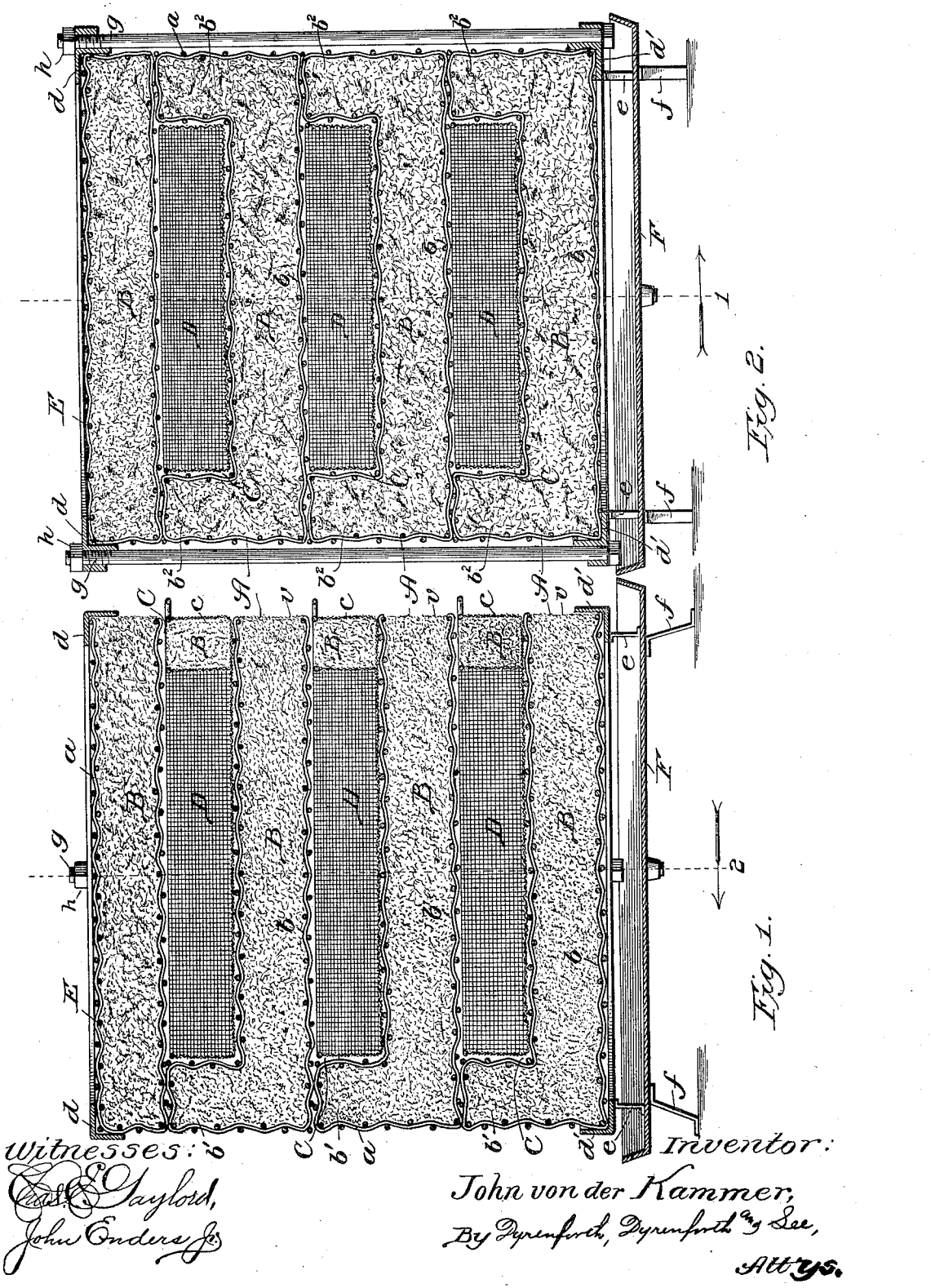

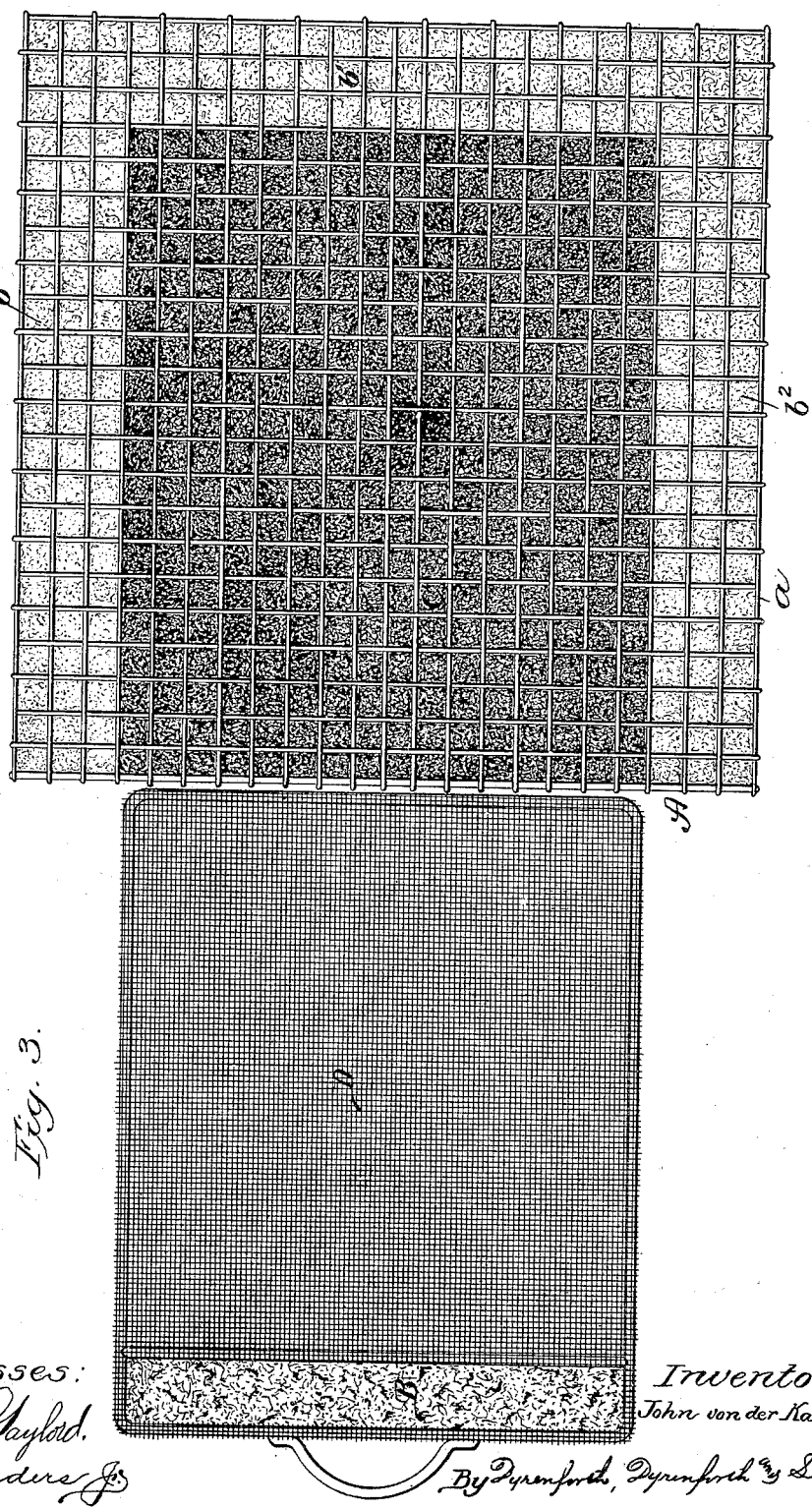

JOHN VON DER KAMMER, OF CHICAGO, ILLINOIS.

SPROUTING APPARATUS.

SPECIFICATION forming part of Letters Patent No. 679,124, dated July 23, 1901.

Application filed January 21, 1901. Serial No. 44,059. (No model.)

*To all whom it may concern:*

Be it known that I, JOHN VON DER KAMMER, a citizen of the United States, residing at Chicago, in the county of Cook and State of Illinois, have invented a new and useful Improvement in Sprouting Apparatus, of which the following is a specification.

The primary purpose of my invention is to render conveniently feasible and economical to farmers and others who make a practice of raising or keeping live stock and poultry the matter of preparing the grains used as feed by sprouting them, thereby to enhance the digestive and nutritious properties of the grains. While this is the primary purpose of my invention, I intend it also for use in promoting the germination of grains generally, thus including the sprouting of barley for making malt and the sprouting of tubers and bulbs.

To these ends my invention consists, broadly, in an apparatus comprising a chamber for the envelopment of the grain, tuber, or bulb to be germinated, having its walls formed of cellular vegetable material possessing the qualities of absorbing and holding moisture without great liability to decomposition.

The material which I find best serves my purpose is moss of the variety known as "sphagnum" moss, though there may be other materials having similar properties which will answer the purpose equally well, or at least satisfactorily. Hence I intend that my invention shall be understood as contemplating the use of any of such materials for the walls of the chamber or chambers of my improved apparatus.

With a view to increasing the usefulness of my improved apparatus I prefer to construct it in separable sections with each section forming a complete apparatus or growing-chamber in itself, so that users may readily vary the capacity of the apparatus according to requirement or arrange it according to the nature of the accommodations for it at hand.

Referring to the accompanying drawings, which represent my apparatus in its preferred sectional form of construction, Figure 1 is a transverse vertical section taken at the line 1 on Fig. 2 and viewed in the direction of the arrow; Fig. 2, a longitudinal vertical section taken at the line 2 on Fig. 1 and viewed in the direction of the arrow; Fig. 3, a plan view of the drawer which forms the grain-receptacle in each chamber, and Fig. 4 a plan view of one of the sections of the apparatus.

A A are similar sections, each formed of a hollow foraminous framework, preferably of wire-mesh $a$ and of the rectangular shape illustrated, and having a hollow rectangular base $b$ open at the front end, as shown at $v$, a raised back end $b'$, and correspondingly-raised sides $b^2\ b^2$, the hollow back end and sides and hollow base being open to each other and compactly stuffed with the moss B, whereby a rectangular chamber C is formed between the sides and back end and surrounded by the moss. In the chamber C fits a sliding drawer D, also preferably formed of woven wire, with a compartment $c$ at its forward end, which is also stuffed with the moss to afford the front inclosing moss wall for the chamber.

Where a single section A composes the apparatus, it is provided with a cover E, of rectangular shape, to fit upon it and formed hollow of open-work, preferably woven wire, like the section, and compactly stuffed with the moss B. Where the apparatus comprises a plurality of sections A, one is imposed upon the other, as shown, each forming a cover for the one below it, except that the uppermost is provided with the cover E, which should have its edges bound by a metal frame $d$, and a similar frame $d'$ should be provided about the edges of the lowermost section, which supports the stack on a base $e$ in a dish-shaped bottom F and on legs $f$, the bottom being wider than the sections to afford a trough and catch-basin for the moisture that drops from the moss. The sections are separably fastened together by headed rods $g$, passing through the frames $d\ d'$ and screw-threaded at their upper projecting ends, to which clamp-nuts $h\ h$ are applied to bind the sections together.

If the framework of the apparatus for confining the moss walls is composed of woven wire or open-work metal in other form, the metal should be galvanized to resist oxidation.

To use the apparatus, it should be located in a suitable place, where the temperature may be maintained at a suitable degree to promote the growing of the grains to be treated, the preferable temperature being that which best promotes the sprouting of the particular grain in the ground, and the moss walls are kept saturated with water and are essentially pervious to air and to the gases generated in them by the air and moisture, to which the remarkable promotion of sprouting in the chamber may be attributable. The grain to be sprouted is introduced into the drawers D, each of which is shown to be provided with a handle $i$ for convenience in withdrawing it for filling and emptying.

The walls of saturated moss, for reasons which I do not undertake to explain, marvelously promote the germination of the grain enveloped by them in each chamber C, sprouting corn, for example, in from twenty to twenty-four hours.

Of course, as will be understood, each section A may be formed of any desired dimensions, so that a single stack may serve to furnish sufficient sprouted feed for a small or large day's consumption.

In the same way that my invention promotes the sprouting of grains it serves in a remarkable degree to promote the sprouting of tubers and bulbs, and I therefore intend it also for that use.

While the foraminous framework is herein described as being formed of metal, it is not my intention to limit my invention thereto. The primary purposes of the frame are those of holding the mass of vegetable material and permitting access to it of air, and these purposes are subserved by forming the foraminous frame of other material than metal, including porous solid material and cloth and even of cord, twine, or the like stitched as a framework through the walls of vegetable material to hold it, which last-named construction answers satisfactorily where the sprouting apparatus is small. I desire to be understood as including within my meaning of a foraminous framework all such constructions of the holding-beams for the vegetable material.

What I claim as new, and desire to secure by Letters Patent, is—

1. In a sprouting apparatus, walls formed of cellular moisture-absorbent vegetable material compacted into a hollow foraminous framework and enveloping a chamber for the grain.

2. In a sprouting apparatus, walls formed of moss compacted into a hollow foraminous framework and enveloping a chamber for the grain.

3. In a sprouting apparatus, the combination of walls formed of cellular moisture-absorbent vegetable material compacted into a hollow foraminous framework and enveloping a chamber for the grain, and a receptacle for the grain, fitting in said chamber and having a compartment at its outer end stuffed with said material to form the outer wall of the chamber.

4. In a sprouting apparatus, the combination of moss compacted into a hollow foraminous framework and enveloping a chamber for the grain, and a receptacle for the grain, fitting in said chamber and having a compartment at its outer end stuffed with moss to form the outer wall of the chamber.

5. In a sprouting apparatus, the combination of a plurality of sections, imposed one upon the other, each section comprising walls composed of cellular moisture-absorbent vegetable material, such as moss, compacted into a hollow foraminous framework and forming a chamber, and a hollow foraminous cover stuffed with said material, on the uppermost section.

6. In a sprouting apparatus, the combination of a plurality of sections imposed, one upon the other, each section comprising walls composed of cellular moisture-absorbent vegetable material, such as moss, compacted into a hollow foraminous framework and forming a chamber, a hollow foraminous cover stuffed with said material, on the uppermost section, and receptacles for the grain fitting in said chambers and having compartments in their outer ends stuffed with said material and forming the outer chamber-walls.

7. A sprouting apparatus comprising, in combination, a plurality of sections imposed one upon the other, each section comprising walls composed of cellular moisture-absorbent vegetable material, such as moss, compacted into a hollow foraminous framework and forming a chamber, a hollow foraminous cover stuffed with said material, on the uppermost section, receptacles for the grain fitting in said chambers and having compartments in their outer ends stuffed with said material and forming the outer chamber-walls, and a catch-basin bottom on which the stack of sections is supported, said sections being separably fastened together.

JOHN VON DER KAMMER.

In presence of—
M. S. MACKENZIE,
ALBERT D. BACCI.